No. 645,088. Patented Mar. 13, 1900.
W. R. HAMLEN.
ELECTRIC MOTOR CONTROL.
(Application filed Apr. 19, 1899.)
(No Model.)
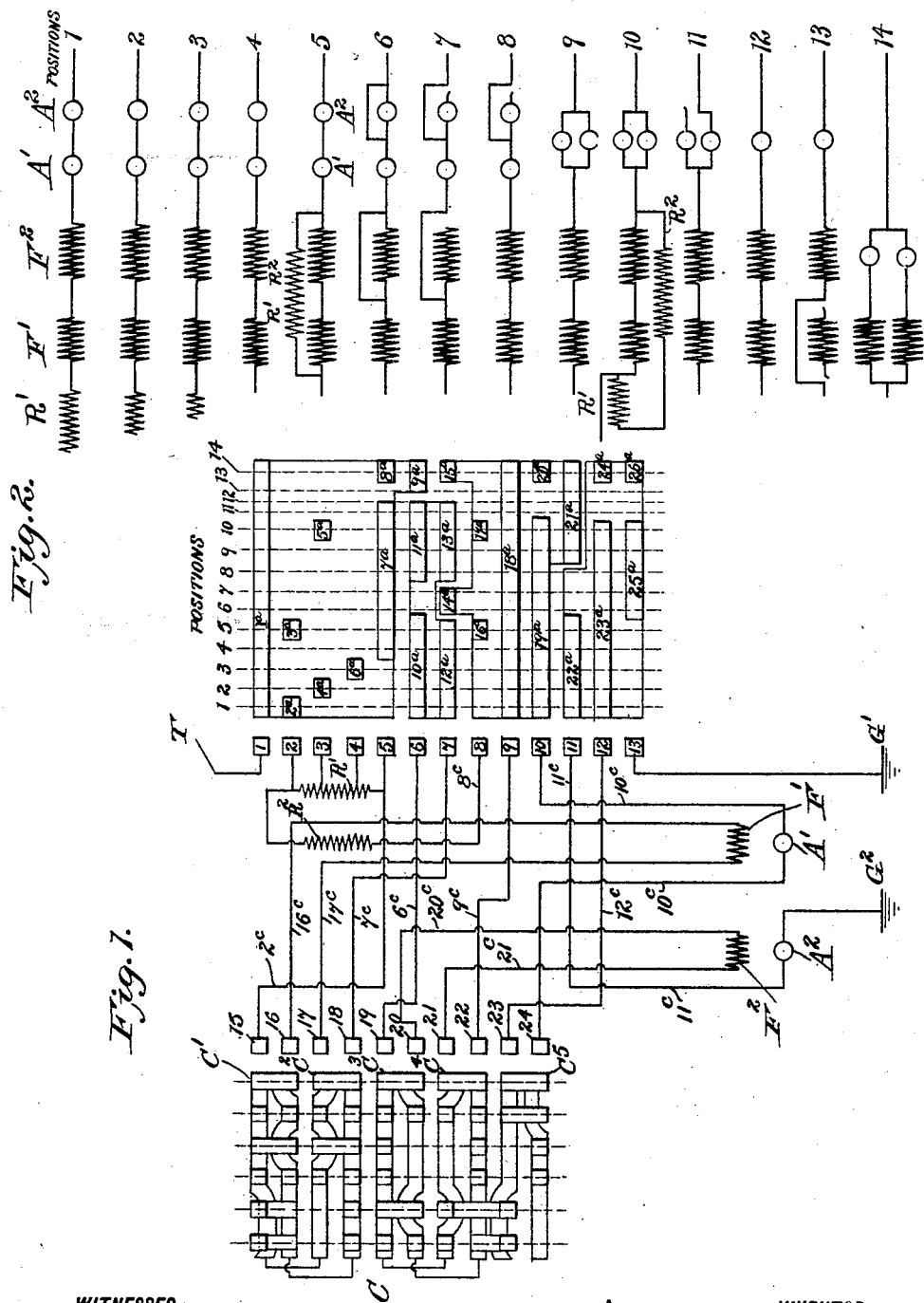
WITNESSES:
M. E. Sharpe.
A. M. Moses.
INVENTOR
Wells R. Hamlen
BY
Richard Tyr
ATTORNEY.

UNITED STATES PATENT OFFICE.

WELLS R. HAMLEN, OF JOHNSTOWN, PENNSYLVANIA, ASSIGNOR TO THE JOHNSON COMPANY, OF PENNSYLVANIA.

ELECTRIC-MOTOR CONTROL.

SPECIFICATION forming part of Letters Patent No. 645,088, dated March 13, 1900.

Application filed April 19, 1899. Serial No. 713,691. (No model.)

*To all whom it may concern:*

Be it known that I, WELLS R. HAMLEN, of Johnstown, in the county of Cambria and State of Pennsylvania, have invented a new and useful Improvement in Electric-Motor Control, of which the following is a full, clear, and exact description, reference being had to the accompanying drawings, which form a part of this specification.

My invention relates to electric systems of control for operating a plurality of motors, and has for its general object the provision of an improved method for accelerating and regulating the speed of the motors by means of certain changes successively effected in the relations between the motors as a whole and between the individual elements thereof.

While the invention is especially designed for use in connection with railway-motors, it is also applicable to other uses.

Broadly considered, my invention consists in a method of accelerating a plurality of motors by which the motors are shifted from a series relation of their elements to a multiple relation by intermediate steps in which one element of each motor is connected in multiple with the corresponding element of the other motor or motors, the other elements being in series. These steps enable me to utilize the resistance and counter electromotive force of the motors to advantage in changing them from series to multiple, at the same time enabling me to prevent the large wastage occurring when the methods ordinarily in vogue are used, which methods use resistances in the multiple positions in the same way and for the same purpose as in the ordinary starting-rheostat employed with a motor or motors in which the motor-circuit is a fixed one at all times. On the other hand, my novel method, as previously outlined and as will hereinafter be described more in detail, does not require a complicated system of connection or produce bad inductive effects upon the motors.

My invention also consists, in connection with such changes, of other steps and combinations thereof whereby abrupt changes in the resistance of the motor-circuits and too-rapid acceleration of the motors are avoided.

In connection with my invention I employ external resistance or resistances, together with means for utilizing the same in the well-known rheostatic manner when starting the motors in series and also utilizing these same resistances or portions thereof to weaken the fields of the motors by shunting part of the current around them.

My invention also consists in certain other novel features of regulation in connection with the method above generally described, as are hereinafter described, and pointed out in the appended claims.

Referring to the accompanying drawings, Figure 1 is a diagram showing two electric motors, a controller, and such parts of the wiring and connections as serve to illustrate the nature and mode of operation of my invention. Fig. 2 shows, diagrammatically, the successive circuit connections or changes made by the operation of the controlling-switch.

Referring to Fig. 1, the letters $A'$ $A^2$ designate the armatures of the two electric motors, and $F'$ $F^2$ the respective field-coils of said motors. Squares 1 to 13, inclusive, designate a series of fixed contact-brushes, which form part of the controlling-switch, the balance of which consists of a plurality of moving contacts—such, for instance, as contact-pieces mounted on a cylinder or drum arranged to be rotated by an operating-lever. This type of controlling-switch is old in the art in so far as its general mechanical construction is concerned, and I have shown only the electrical contacts and their connections. These contacts are represented by the rectangles $1^a$ to $26^a$ and are divided into four different groups, each of which is electrically disconnected from the others, but whose individual contacts are each connected electrically to all the others of that group. Contacts $1^a$ to $9^a$, inclusive, comprise one group; contacts $10^a$ to $13^a$, a second group; contacts $14^a$ to $21^a$, inclusive, a third group; contacts $22^a$ to $26^a$, inclusive, a fourth group. Certain of the contacts, as $9^a$, $14^a$, $15^a$, $21^a$, and $22^a$, while belonging electrically to the groups in which they are above classified, in point of position with respect to brushes, are included on a portion of the controller drum or cylinder which belongs otherwise to an adjacent group, whereby certain of the brushes are designed to operate with contacts of two different groups in different positions of the controller. Brushes 6, 7, and 11 are shown as being of this class.

The numerals 15 to 24 designate a series of brushes which constitute the fixed contact members of a reversing-switch which is also provided with groups of movable contacts C. This switch and its connections form no part of the present invention and are shown only for the purpose of enabling the circuits to be traced. For this purpose it will be sufficient to consider only the contacts $C'$ $C^2$ $C^3$ $C^4$ $C^5$, with which it will be assumed hereinafter that the brushes 15 to 24 are in engagement.

The brush No. 1 is connected to the high-potential or trolley side of the circuit (indicated at T) through the usual portions of the car-wiring and instruments. (Not shown.) Brush No. 2 is connected to brush No. 15 through an external resistance $R'$ and connection $2^c$. Brushes 3 and 4 are also connected to brush 15 through portions of said resistance and connections $2^c$. Brush 5 is also connected to brush 15 by connection $2^c$, brush 6 to brush 19 by connection $6^c$, brush 7 to brush 18 by connection $7^c$, brush 8 to connection $2^c$ by connection $8^c$ and resistances $R^2$ $R'$, brush 9 to brush 22 by connection $9^c$, brush 10 to brush 24 through armature $A'$ and connections $10^c$, brush 11 to ground $G^2$ through armature $A^2$ and connections $11^c$, and brush 12 to brush 23 by connection $12^c$. Brushes 16 and 17 are connected to each other through field $F'$ and conductors $16^c$ and $17^c$ and brush 20 to brush 21 through field $F^2$ and conductors $20^c$ $21^c$.

The dotted vertical lines 1 2, &c., indicate the several positions of the brushes 1 to 13 on the movable contacts in passing from a series to a multiple connection of the motors, and Fig. 2 shows, diagrammatically, the connection of the two motors and their elements at each position of the said brushes 1 to 13. At the first position of these brushes brushes 3, 4, 5, 8, and 13 are not engaging any of the movable contacts; but brushes 1, 2, 6, 7, 9, 10, 11, and 12 are respectively in engagement with contacts $1^a$, $2^a$, $10^a$, $12^a$, $18^a$, $19^a$, $22^a$, and $23^a$, and the course of the current (assuming brushes 15 to 24 to be engaging the contacts $C'$, $C^2$, $C^3$, $C^4$, and $C^5$) is as follows: from trolley T to brush 1, contacts $1^a$ $2^a$, brush 2, resistance $R'$, connection $2^c$, brush 15, contact $C'$, brush 16, connection $16^c$, field $F'$, connection $17^c$, brush 17, contact $C^2$, brush 18, connection $7^c$, brush 7, contacts $12^a$ $10^a$, brush 6, connection $6^c$, brush 19, contact $C^3$, brush 20, connection $20^c$, field $F^2$, connection $21^c$, brush 21, contact $C^4$, brush 22, connection $9^c$, brush 9, contacts $18^a$ $19^a$, brush 10, connection $10^c$, armature $A'$ to brush 24, contact $C^5$, brush 23, connection $12^c$, brush 12 to contacts $23^a$ $22^a$, brush 11, connection $11^c$, through armature $A^2$ to ground $G^2$. In this position therefore the current passes through the artificial resistance R and through the field-magnets and armatures of both motors in series. This is shown in position 1 of Fig. 2. At the next position the only change made in the contacts is that brush 2 passes off the contact $2^a$ and brush 3 becomes engaged with the contact $4^a$. The effect of this change, it will be seen, is to cut out of the motor-circuit a portion of the artificial resistance $R'$. No other changes are made in the circuit. At the third position brush 4 engages contact $6^a$ and brush 3 has left contacts $4^a$. The effect of this change is to cut out still more of the resistance $R'$ without disturbing otherwise the circuit. In the fourth position brush 4 has left contact $6^a$ and the brush 5 has engaged contact $7^a$. The current now passes directly from the contact $1^a$ to contact $7^a$, to brush 5, connection $2^c$, &c., as in the previous positions, resistance $R'$, however, being entirely cut out. Up to this point it will be noted that nothing but ordinary rheostatic regulation has been employed. In the fifth position brush 2 engages contact $3^a$ and brush 8 engages contact $16^a$. Otherwise the points of contact are the same as in position 4. The effect of these changes is that the current divides, one part passing from brush 5, through connection $2^c$, and thence through both fields and armatures as before and the other part passing through the resistance $R'$, connection $8^c$, brush 8, contacts $16^a$ and $19^a$, to brush 10, and thence through both armatures in series. In this position the resistance is no longer used rheostatically, but is used as a shunt to the field-winding, so that the fields may be weakened and the counter electromotive force correspondingly decreased, thereby allowing more current to pass to the armatures and accelerate them. The next three positions are "passover" or temporary positions, and it is not deemed necessary to trace out the connection in detail. In the first of these positions (position 6) the engagement of the brush 7 with the contact $14^a$ (while still bridging onto the contact $12^a$) of the third group short-circuits the field $F^2$, and by the contact of the brush 13 with contact $25^a$ the armature $A^2$ is also short-circuited. The next position (by reason of the passing of brush 7 from contact $12^a$ wholly onto contact $14^a$) breaks the circuit through field $F^2$ and (by reason of the disengagement of brush 11 with contact $22^a$) cuts out the armature $A^2$. The eighth position by reason of the fact that the brush 7 again engages a contact of the second group (contact $13^a$) once more puts the two fields in series, armature $A^2$ remaining cut out. At the ninth position, which is an essential working position and perhaps the most important feature of the system, the two fields remain in series, but the two armatures are coupled up in parallel. The parallel coupling of the armatures results in a considerable acceleration of the speed; but this is sufficiently counteracted by the series coupling of the two fields and their consequent maximum resistance and abnormal strength to give no more than the desired amount of acceleration. Thus the first position in which the armatures are in parallel they are protected from receiving too great a rush of current not only because of the ohmic resistance of the two fields in series, but also by the counter electromotive force caused by the abnormally-strong fields. This change is effected by reason of the brush 11 being in engagement with the contact 21$^a$ of the fourth group, while brushes 12 and 13 remain in engagement with the contacts 23$^a$ and 25$^a$. By reason of this change the current is divided, part going by brush 10 and connection 10$^c$ to armature A' and thence to ground and the other part going by brush 11 and connection 11$^c$ through armature A$^2$ to ground. In position 10, which is also a working or "notch" position, brushes 3 and 8 have engaged, respectively, the contacts 5$^a$ and 17$^a$ of the first and third groups, respectively, thereby throwing part of resistance R' and resistance R$^2$ in shunt to the fields F' F$^2$, which remain in series with each other, armatures A' A$^2$ also remaining in parallel with each other. The effect of this change is to again reduce the strength of the fields by providing an additional path for the current. Positions 11, 12, and 13 are temporary or passover positions. In position 11 the brushes 3 and 8 have left the contacts 5$^a$ and 17$^a$, thereby cutting the resistances R' R$^2$ out of circuit. Brushes 12 and 13 have also left the contacts 23$^a$ 25$^a$, thereby breaking the ground connection of the armature A'. In position 12 the brush 10 has left the contact 19$^a$, cutting out armature A', the current passing from contact 21$^a$ to brush 11 through armature A$^2$ to ground. In position 13 brush 5 has passed from the contact 7$^a$ of the first group and brush 6 has left contact 11$^a$ of the second group and engages contact 9$^a$ of the first group, thereby cutting out field F', the other contacts remaining the same as in the last position. Position 14 is the last position and brings the two motors as a whole in parallel with the fields and armatures of each motor in series. This is effected as follows: Brushes 1, 5, 6, 7, 9, 10, 11, 12, and 13 are respectively engaged with contacts 1$^a$, 8$^a$, 9$^a$, 15$^a$, 18$^a$, 20$^a$, 21$^a$, 24$^a$, and 26$^a$. The course of the current is now from trolley T to contact 1$^a$ to contacts 8$^a$ 9$^a$. Here it divides, one part passing by the brush 5, connection 2$^c$, brush 15, contact C', brush 16, connection 16, field F', connection 17$^c$, brush 17, contact C$^2$, brush 18, connection 7$^c$, brush 7, contact 15$^a$, and contact 20$^a$ to brush 10, connection 10$^c$, through armature A', brush 24, contact C$^5$, brush 23, connection 12$^c$, brush 12, contacts 24$^a$ 26$^a$, and brush 13 to ground. The other part passes from contact 9$^a$ to brush 6, connection 6$^c$ to brush 19, contact C$^3$, brush 20, connection 20, connection 20$^c$, field F$^2$, brush 21, contact C$^4$, brush 22, connection 9$^c$, brush 9, contact 18$^a$ to contact 21$^a$, brush 11, connection 11$^c$ through armature A$^2$ to ground.

It will be observed therefore that in my method of control I start with the two fields and the two armatures connected in series with each other and with artificial resistance; that I gradually cut the resistance out of circuit while retaining the series connections of the motor elements; that I next use the same resistance in shunt with the motor-fields still in series; that I next pass rapidly through a series of preparatory changes in which first one field and one armature are short-circuited, then cut out, and, thirdly, the fields are connected in series with one armature to a working position, wherein the two fields are connected in series with the two armatures in parallel; that I next throw the resistance into parallel with the two fields in series and the two armatures in parallel; then by successive preparatory changes, in which first one armature and then one field are cut out, I bring the motors as a whole to multiple relation. In this manner I am able with the waste of very little power in external resistances and by the movement of a single operating-lever to attain a gradual acceleration of the motors and without making at any time such an abrupt change as to injure the motors.

The apparatus which I have herein shown and described for carrying into effect my improved method of control is claimed in a divisional application filed by me. I do not wish, however, to be limited to this particular apparatus in the practice of my invention, nor do I wish to be limited to immaterial and non-essential details involved in the method as above described.

Having thus described my invention, what I claim as new, and desire to secure by Letters Patent, is—

1. The method of accelerating a plurality of electric motors, which consists in starting with the motor elements all in series with each other and with external resistance, gradually reducing and finally cutting out the resistance while maintaining the series relation, then connecting one element of each motor in multiple with the corresponding element of the other motor, and finally connecting the motors as a whole in parallel.

2. The method of accelerating a plurality of electric motors which consists in starting the motors with their elements all connected in series, then cutting out one element of each motor, then connecting one element of each motor in multiple with the corresponding element of the other motor or motors, with the other elements in series, then again cutting out one element of each motor, and finally connecting the motors as a whole in multiple.

3. The method of accelerating a plurality of electric motors, which consists in starting the motors with their elements connected in series, then placing a shunt-resistance in parallel with their fields, then connecting the two armatures in multiple and removing said shunt, then again shunting said fields, and finally connecting said fields in parallel with said shunt removed.

4. The method of shifting two motors from series to parallel relation which consists in placing a shunt-resistance in parallel with their fields, then connecting one element of each motor in multiple with the corresponding element of the other motor, and the other elements in series with each other, and cutting out the resistance, then again shunting the fields, and finally removing the field-shunt and connecting the two motors in parallel, substantially as specified.

5. The method of accelerating two electric motors, which consists in starting them with their elements all connected in series with each other and with an artificial resistance, then rheostatically accelerating them by gradually cutting out said resistance and subsequently connecting said resistance in shunt with the fields, then short-circuiting one field and one armature, then connecting the fields in series and the armatures in parallel, then again introducing resistance in shunt with the fields, next successively cutting out the resistance, the armature of one motor and the field of the other, and finally connecting the motors as a whole in parallel.

6. The method of operating a pair of electric motors which consists in starting with the two fields and the two armatures in series, then connecting one pair only of said elements in multiple, and finally connecting the motors as a whole in multiple and preparatory to each of said changes, introducing resistance in parallel circuit with the series-connected elements of the motors.

7. The method of accelerating a pair of electric motors, which consists in first gradually reducing the resistance of the motor-circuit as the counter electromotive force increases, then bringing the motors to a relation wherein one element of each motor is in series with the corresponding element of the other motor, and the other elements are in multiple to each other, subsequently weakening the fields of the motors, and finally connecting the motors in parallel.

In testimony whereof I have affixed my signature in presence of two witnesses.

WELLS R. HAMLEN.

Witnesses:
 EDWARD SCHULTZ,
 MYRON E. OGDEN.